United States Patent [19]

Levine et al.

[11] Patent Number: 4,962,661
[45] Date of Patent: Oct. 16, 1990

[54] LIQUID LEVEL SENSING SWITCH ACTUATOR

[75] Inventors: Robert A. Levine, Westminster; William M. Croke, Huntington Beach, both of Calif.

[73] Assignee: Atlantic Richfield Company, Los Angeles, Calif.

[21] Appl. No.: 478,114

[22] Filed: Feb. 9, 1990

[51] Int. Cl.$^5$ .............................................. G01F 25/00
[52] U.S. Cl. ...................................................... 73/1 H
[58] Field of Search ................................. 73/1 H, 1 D

[56] References Cited

U.S. PATENT DOCUMENTS

| | | | |
|---|---|---|---|
| 3,578,755 | 5/1971 | Bynum et al. | 73/1 H |
| 3,640,117 | 2/1972 | Stilling | 73/1 H |
| 3,710,612 | 1/1973 | Innes et al. | 73/1 H |

FOREIGN PATENT DOCUMENTS 0146011 11/1980 Japan ...................................... 73/1 H Primary Examiner—Robert Raevis
Attorney, Agent, or Firm—Michael E. Martin

[57] ABSTRACT

An actuator for a liquid level sensing switch, particularly useful for testing level sensing switches on storage tanks and tanker cargo tanks. The actuator includes an elongated rod which is slidably supported on and extends through a two part body which may be supported on a flange or a deck portion above the tank. An elongated flexible cable interconnects the rod with a float member of the level sensing switch whereby the actuator rod may be pulled upward to effect movement of the float while, in the normal non-activated position of the actuator, the float may move freely between its limit positions for sensing liquid level in the tank.

12 Claims, 1 Drawing Sheet

LIQUID LEVEL SENSING SWITCH ACTUATOR

BACKGROUND OF THE INVENTION

1. Field of the Invention

The present invention pertains to a liquid level sensing switch manual actuator for confirming the operability of the switch, particularly in applications for determining the operability of liquid level sensing switches in storage tanks and vessel cargo tanks.

2. Background

In certain applications of liquid level sensing switches the liquid level sensing mechanism is inaccessible for actuation to confirm the operability of the switch. One such application is in regard to liquid level sensing switches used in the cargo tanks of crude oil and refined petroleum products tankers, for example. In order to comply with the requirements of regulatory authorities and to help minimize the risk of overfilling tanks it is desirable and necessary to confirm the operability of liquid level sensing switches so that cargo loading operations may be carried out properly.

However, human access to many cargo holds and storage tanks which contain flammable or toxic materials or an inert atmosphere is not possible or at least normally forbidden and it is therefore necessary to provide some type of actuator which is operable, at will, exterior of the tank to confirm the operability of a liquid level sensing switch disposed in the tank. It is to this end that the present invention is directed with a view to providing an actuator for actuating the float member of a liquid level sensing switch disposed in the cargo tank of a marine tanker or the like.

SUMMARY OF THE INVENTION

The present invention provides an actuator for a liquid level sensing switch for moving a float member associated with the switch, at will, to confirm the operability of the switch.

In accordance with an important aspect of the present invention an actuator for operating the float member of a liquid level sensing switch is provided which may be mounted on a top wall or deck covering the top of a storage or cargo tank in which the liquid level sensing switch is disposed. The actuator includes a manual actuating rod which is connected by way of a flexible cable or the like to the float member of the switch. The actuating rod extends through a support body which may be threadedly connected to a deck, cover or top wall of the storage tank and which is sealed to prevent leakage of fluids between the interior and exterior of the tank.

The present invention further provides a manual actuator for a liquid level sensing switch which is rugged and reliable, may be locked in a predetermined position, utilizes seals suitably placed in the actuator support structure to minimize the leakage of fluids with respect to the storage tank and is easy to operate to confirm the operability of the level sensing switch.

Those skilled in the art will recognize the above described features and advantages of the present invention together with other superior aspects thereof upon reading the detailed description which follows in conjunction with the drawing.

DESCRIPTION OF A PREFERRED EMBODIMENT

Figure 1:
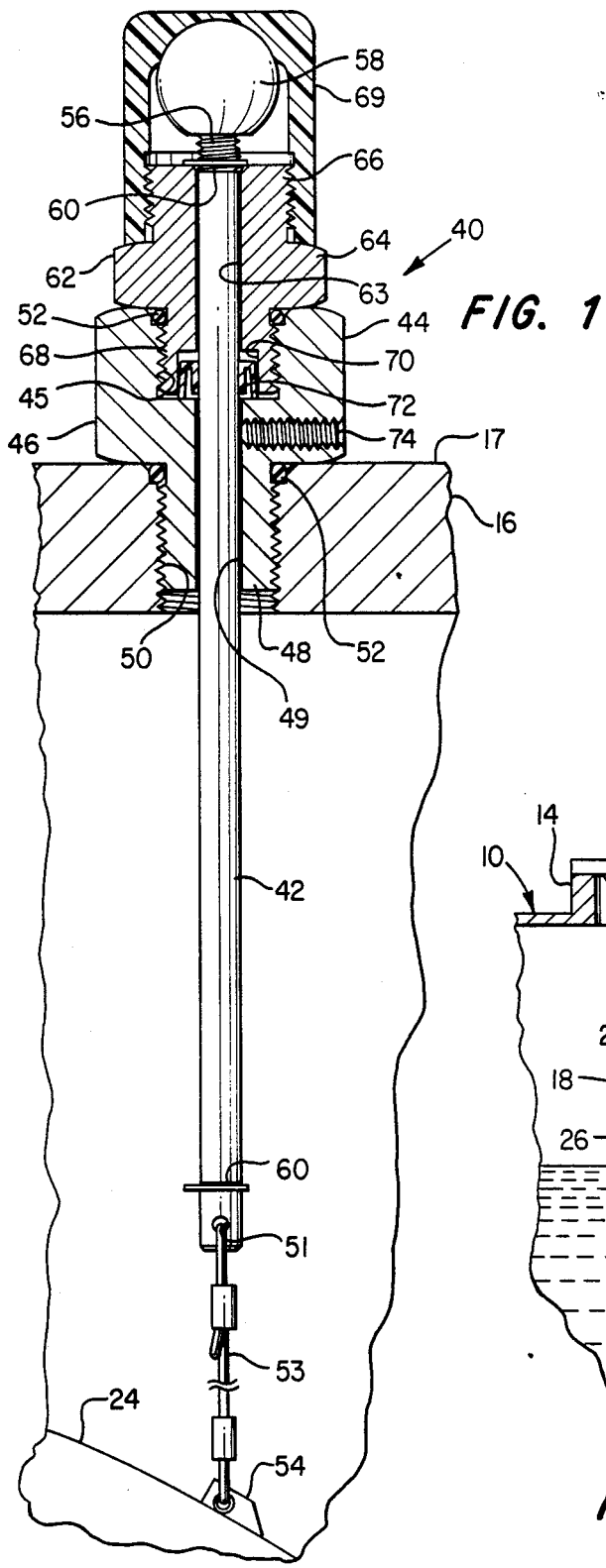
FIG. 1 is a vertical elevation in somewhat schematic form of a typical liquid level sensing switch and a manual actuator, therefor in accordance with the present invention.

In the description which follows, like parts are marked throughout the specification and drawing with the same reference numerals, respectively. The drawing figures may not be to scale and certain elements may be shown in generalized or schematic form in the interest of clarity and conciseness.

Figure 2:
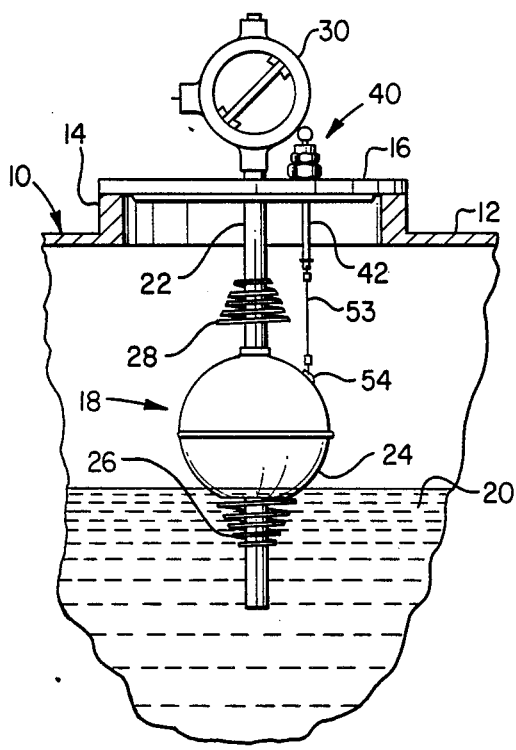
FIG. 2 is a vertical central section view of the actuator illustrated in FIG. 1.

Referring to FIG. 2, there is illustrated a portion of a cargo tank 10 for a marine oil tanker or the like. The cargo tank 10 includes a top wall 12 comprising part of a deck of the tanker and an access port 14 formed by a generally cylindrical coaming which is covered by a hatch cover or flange 16 for a liquid level sensing or float switch, generally designated by the numeral 18. The liquid level sensing switch 18 is disposed within the cargo tank 10 for sensing the level of liquid 20 which may comprise crude oil or refined petroleum products, for example. The switch 18 may be of a type commercially available such as a GEMS LS 58000 Series marine grade level switch manufactured by TransAmerica Delaval, Inc. of Farmington, Conn. The level sensing switch 18 includes a generally depending stem assembly 22 which projects through the flange 16 and supports for limited vertical excursion thereon a generally cylindrical float member 24. The float member 24 is operable to move between limit positions determined by cushion members 26 and 28 in response to the rise and fall of the liquid level in the tank 10. The stem 22 projects through the flange 16 and terminates in a wiring junction box 30. In response to vertical movement of the float member 24 along the stem 22 electrical signals are transmitted through conductor wires, not shown, within the stem 22 and the junction box 30 to a suitable control panel, also not shown.

In many instances it is desirable and possibly subject to regulatory requirements that the operability of the switch 18 be confirmed from time to time. For example, in order to avoid overfilling the cargo tank the switch 18 senses the rising level of liquid 20 in the tank so that appropriate action may be taken to close valves, shut off pumps or the like. Accordingly, before and during certain liquid transfer operations with respect to the tank 10 it is desirable to confirm the operability of the switch 18 by moving the float 24 vertically along the stem 22. The present invention provides a unique manual actuator for accomplishing this function.

Referring to both FIGS. 1 and 2 and, in particular, FIG. 2, there is illustrated a unique manual actuator for the float 24, which actuator is generally designated by the numeral 40. The actuator 40 includes an elongated actuating rod 42 which is slidably supported on and extends through a support member 44 having a generally hexagonal shaped body 46 and a threaded spigot portion 48 which is shown threadedly engaged with the flange 16 through a tapped hole 50 extending therethrough. An O-ring seal 52 is disposed in an annular recess coaxial with the tapped hole 50 and forms a fluid-tight seal between the support member 44 and the face 17 of the flange 16. The rod 42 fits relatively snugly but slidably within a bore 49 extending through the member 44.

The lower distal end of the rod 42 is provided with a transverse bore 51 through which an elongated flexible cable 53 is terminated at one end. The opposite end of the cable 53 is connected to a tab 54 which is supported on the float 24 and may be suitably secured thereto such as by welding or being formed as an integral part of the float. The opposite end of the rod 42 is threaded as indicated at 56 and receives an actuating knob 58 thereon. The length of travel of the rod 42 is delimited at opposite ends by stop means formed by retaining rings 60 which are suitably secured on the rod 42 in cooperating circumferential grooves formed in the rod in a conventional manner.

The actuating rod 42 also extends through a second support member 62 which includes a hexagonal shaped body portion 64 and opposed externally threaded, spigot portions 66 and 68. As illustrated in FIG. 1, the spigot portion 68 is threadedly engaged with the support member 44 by way of a threaded bore 45 extending into the support body portion 46 and coaxial with the bore 49. The bore 45 is suitably counterbored with an annular groove for receiving an O-ring seal 52 between the body portion 64 of the member 62 and the body portion 46 of the member 44. The distal end of the spigot portion 68 is provided with a cylindrical recess 70 in which is disposed a resilient annular seal member 72 which extends around and is in sealing engagement with the rod 42. The seal 72 may be of a type typically used for sealing piston rods of hydraulic or pneumatic cylinder type actuators. The seal member 72 is typically retained in the bore 70 by an interference fit but, in operation of the actuator 40, the seal 72 is nevertheless retained in the bore 70 since it cannot escape from the bore while the spigot 68 is threaded into the body 46.

The rod 42 also extends through a bore 63 formed in the member 62 and which is dimensioned to provide a snug but slidable fit of the rod 42 within the bore. The threaded spigot portion 66 may be provided with a removable cap 69 extending thereover to form a protective cover for the actuating knob 58. The cap 69 may be provided with suitable indicia to identify which level sensing switch is connected to the actuator 40. The rod 42 may also be locked in a selected position by a locking screw 74 threaded into a transverse bore in the body portion 46 of the member 44.

The operation of the actuator 40 is believed to be readily understandable from the foregoing description. However, briefly, the rod 42 is normally located in the position illustrated in FIG. 2 to permit a slight amount of slack in the cable 53 when the float 24 is at rest against the cushion 26 thereby allowing the float 24 to rise and seek its own position on the stem assembly 22 as dictated by the level of liquid in the tank 10. The rod 42 may be locked in the position illustrated by tightening the screw 74 which is provided with a conventional slotted head but which may also be provided with an external actuating member, not shown.

When it is desired to test the switch 18 the screw 74 is backed away from the rod 42 to permit free movement thereof, the cap 69, if used, is removed from the member 62 and the knob 58 is grasped to effect an upward pulling movement on the rod 42 toward its limit position as dictated by the shoulder provided by the lowermost retaining ring 60. Upward pulling movement of the rod 42 will effect upward movement of the float 24 to a position which will test or confirm the operation of the switch associated with the float. The rod 42 and the knob 58 are not located in a plane which will permit interference of the rod with the junction box 30 as might be suggested by the illustration of FIG. 2. Thanks to the arrangement of the O-ring seals 52 and the resilient seal 72 fluids may not escape from or flow into the tank 10 through the bores 49 or 63 or in any way through the support members 44 and 62.

The actuator 40 may be constructed of conventional engineering materials used in marine, explosive and corrosion prone environment namely stainless steel and bronze. Although a preferred embodiment of the invention has been described in detail herein those skilled in the art will recognize that various substitutions and modifications may be made to the actuator described without departing from the scope and spirit of the invention as recited in the appended claims.

What is claimed is:

1. An actuator for a liquid level sensing switch for testing the operability of said level sensing switch operation, said level sensing switch including a float member moveable in response to a change in liquid level in a tank to effect a signal related to said changing level, said actuator comprising:
    a support member adapted to be secured to a part supported by said tank, said support member having a generally cylindrical bore extending therethrough;
    an elongated actuating rod extending through said bore and into said tank;
    means connected to said rod for causing said rod to be moved relative to said support member to effect movement of said float member; and
    means interconnecting said float member with said rod and responsive to movement of said rod in one direction while permitting the movement of said float member with respect to said rod in response to said changing level of liquid in said tank, said interconnecting means being positioned within said tank during normal level sensing switch operation.

2. The actuator set forth in claim 1 wherein:
    said means interconnecting said rod with said float member comprises flexible cable means.

3. The actuator set forth in claim 1 including:
    stop means on said rod operable to engage said support member in response to movement of said rod to limit said movement of said rod.

4. The actuator set forth in claim 1 including:
    means for locking said rod in a selected position with respect to said support member.

5. The actuator set forth in claim 1 wherein:
    said support member includes a threaded portion for engagement with a member comprising at least part of a top wall of said tank and said support member includes means for engaging a second support member for said rod, said second support member including a bore through which said rod extends.

6. The actuator set forth in claim 5 wherein: said support member and said second support member each include a body portion including means for engagement with a wrench for connecting said support member to said tank and for connecting said support member to said second support member.

7. The actuator set forth in claim 5 wherein:
    said second support member includes resilient seal means disposed therein and engagable with said rod for forming a substantially fluid-tight seal to prevent fluid leakage into or from sad tank.

8. The actuator set forth in claim 5 wherein: said rod includes an actuating knob formed thereon.

9. The apparatus set forth in claim 8 wherein: said second support member includes a removable cap engaged therewith and covering said knob.

10. The actuator set forth in claim 9 wherein: said second support member includes a hexagonal body portion, and opposed generally coaxially projecting threaded spigot portions, one of said spigot portions being threadedly engaged with said support member.

11. The actuator set forth in claim 10 wherein: the other of said spigot portions is threadedly engaged with said cap.

12. An actuator for a liquid level sensing switch for testing the operability of said level sensing switch, said level sensing switch including a float member movable in response to a change in liquid level in a tank to effect a signal related to said changing level, said actuator comprising:
- a first support member including a threaded portion for engagement with a member comprising at least part of a top wall of said tank, said first support member having a generally cylindrical bore extending therethrough and means on said first support member for engaging a second support member;
- a second support member including means for coupling said second support member to said first support member, said second support member having a generally cylindrical bore extending therethrough and alignable with said bore in said first support member;
- an elongated actuating rod extending through said bores in said first support member and said second support member and into said tank;
- resilient seal means disposed one of said support members and engagable with said rod for forming a substantially fluid tight seal to prevent fluid leakage into or from said tank;
- means connected to said rod for causing said rod to be moved relative to said support members to effect movement of said float member; and
- flexible cable means interconnecting said float member with said rod and responsive to movement of said rod in one direction to move said float member while permitting the movement of said float member with respect to said rod in response to a changing level of liquid in said tank.

* * * * *